United States Patent
Xiao (10) Patent No.: US 8,427,978 B2
(45) Date of Patent: Apr. 23, 2013

(54) SYSTEM AND METHOD FOR INFORMATION FEEDBACK IN A WIRELESS COMMUNICATIONS SYSTEM WITH COORDINATED MULTIPLE POINT TRANSMISSION

(75) Inventor: Weimin Xiao, Hoffman Estates, IL (US)

(73) Assignee: FutureWei Technologies, Inc., Plano, TX (US)

( * ) Notice: Subject to any disclaimer, the term of this patent is extended or adjusted under 35 U.S.C. 154(b) by 242 days.

(21) Appl. No.: 12/837,282

(22) Filed: Jul. 15, 2010

(65) Prior Publication Data

US 2011/0013710 A1 Jan. 20, 2011

Related U.S. Application Data

(60) Provisional application No. 61/226,162, filed on Jul. 16, 2009.

(51) Int. Cl.
H04L 12/28 (2006.01)

(52) U.S. Cl.
USPC .......................................... 370/254; 370/328

(58) Field of Classification Search .................. 370/252, 370/254, 328, 329
See application file for complete search history.

(56) References Cited

U.S. PATENT DOCUMENTS

| | | | |
|---|---|---|---|
| 2006/0223449 A1 | 10/2006 | Sampath et al. | |
| 2008/0137635 A1 | 6/2008 | Pan et al. | |
| 2010/0085917 A1* | 4/2010 | Gorokhov et al. | 370/328 |
| 2010/0091678 A1* | 4/2010 | Chen et al. | 370/252 |
| 2010/0098012 A1* | 4/2010 | Bala et al. | 370/329 |
| 2010/0103834 A1* | 4/2010 | Gorokhov et al. | 370/252 |
| 2010/0104033 A1* | 4/2010 | Gorokhov | 375/260 |
| 2010/0189038 A1* | 7/2010 | Chen et al. | 370/328 |
| 2010/0272074 A1* | 10/2010 | Cheng et al. | 370/336 |
| 2010/0291940 A1* | 11/2010 | Koo et al. | 455/450 |
| 2010/0322171 A1* | 12/2010 | Dekorsy et al. | 370/329 |
| 2010/0322176 A1* | 12/2010 | Chen et al. | 370/329 |
| 2010/0323611 A1* | 12/2010 | Choudhury | 455/7 |
| 2012/0044849 A1* | 2/2012 | Farmanbar et al. | 370/312 |
| 2012/0087273 A1* | 4/2012 | Koo et al. | 370/252 |

FOREIGN PATENT DOCUMENTS

| | | |
|---|---|---|
| CN | 101180820 A | 5/2008 |
| CN | 101385253 A | 3/2009 |
| CN | 101394378 A | 3/2009 |
| EP | 1 973 284 A2 | 9/2008 |

OTHER PUBLICATIONS

"3rd Generation Partnership Project; Technical Specification Group Radio Access Network; Evolved Universal Terrestrial Radio Access (E-UTRA); Physical layer procedures, (Release 8)," 3GPP TS 36.213, V8.7.0, May 2009, 77 pages.

(Continued)

Primary Examiner — Jung Park
(74) Attorney, Agent, or Firm — Slater & Matsil, L.L.P.

(57) ABSTRACT

A system and method for information feedback in a wireless communications system with coordinated multiple point (CoMP) transmission are provided. A method for operating in a communications system, the communications system having a first communications controller and a second communications controller participating in a CoMP cooperation set, the method includes selecting a CoMP processing technique, and reporting channel information to the first communications controller. The channel information is based on the preferred CoMP processing technique.

23 Claims, 4 Drawing Sheets

OTHER PUBLICATIONS

Qualcomm Europe, "Summary of email discussions for CoMP," 3GPP TSG-RAN WG1 #57, R1-092232, May 4-8, 2009, 17 pages, San Francisco, CA.

Qualcomm, Europe, "TP for feedback in support of DL CoMP for LTE-A TR," 3GPP TSG-RAN WG1 #57, R1-092284, May 4-8, 2009, 4 pages, San Francisco, CA.

"3rd Generation Partnership Project; Technical Specification Group Radio Access Network; Further Advancements for E-UTRA, Physical Layer Aspects, (Release 9)," 3GPP TR 36.814, V1.1.1, Jun. 2009, 38 pages.

PCT International Search Report, International Application No. PCT/CN2010/075219, Nov. 4, 2010, Huawei Technologies Co., Ltd. et al., 10 pages.

* cited by examiner

SYSTEM AND METHOD FOR INFORMATION FEEDBACK IN A WIRELESS COMMUNICATIONS SYSTEM WITH COORDINATED MULTIPLE POINT TRANSMISSION

This application claims the benefit of U.S. Provisional Application No. 61/226,162, filed on Jul. 16, 2009, entitled "System and Method for Information Feedback in a Wireless Communications System with Coordinated Multiple Point Transmission," which application is hereby incorporated herein by reference.

TECHNICAL FIELD

The present invention relates generally to wireless communications, and more particularly to a system and method for information feedback in a wireless communications system with coordinated multiple point (CoMP) transmission.

BACKGROUND

In order to achieve better channel utilization and increase overall performance, multiple transmission and multiple reception antennas (also commonly referred to as multiple input, multiple output (MIMO)) at both enhanced Node B (eNB) (or base station (BS), Node B (NB), and so forth) and User Equipment (UE) (or mobile station (MS), terminal (TE), and so on) are considered.

An extension to MIMO makes use of multiple NBs to transmit to a single UE or a group of UEs, with the transmissions made by the NBs being coordinated so that the UE or the group of UEs may be able to either combine the transmissions made by the NBs or avoid interference to improve overall performance. The extension is commonly referred to as coordinated multiple point transmission (CoMP). Other coordination schemes involving multiple NBs, such as various time and/or frequency domain reuse and/or power control schemes, may be known as fractional/soft reuse, or interference coordination schemes, or muting, is often considered to be a category of CoMP operation.

Generally, to have better spectral efficiency, a transmitter in a MIMO system needs to know information regarding channels between transmitter and receiver antennas. One commonly used technique is to have a receiver feedback channel information to the transmitter. For example, the receiver may measure the channel between it and the transmitter and feed information regarding the channel back to the transmitter. Channel information may include information such as precoding matrix indicator (PMI) which may be an indication of the precoding to be used, channel state information (CSI) which may be information pertaining to the measured long term or short term channel, channel quality indicator (CQI) which may be an indication of the measured quality of the channel, rank indicator (RI) which may be an indication of a number of spatial layers that can be supported by the channel, and so forth.

When a communications system is using CoMP to help improve overall efficiency, a receiver may need to transmit channel information to multiple transmitters, which the channel information for each transmitter comprising channel information for each of the transmitters transmit antennas and the receivers receive antennas. Therefore, as the number of NBs used in CoMP increase, the amount of feedback overhead can also dramatically increase.

Typically, the feeding back of channel information may be categorized into one of two groups: explicit feedback and implicit feedback. In explicit feedback the receiver provides channel information to the transmitter in an un-encoded (raw) form or with little processing, while in implicit feedback the receiver, given a set of assumptions made by the transmitter and/or the receiver, provides a processed or encoded form of the channel information or a subset of the channel information to the transmitter to help reduce the amount of feedback overhead.

Explicit feedback may result in a significant amount of feedback information to transmit, potentially making explicit feedback a poor candidate when feedback overhead is considered. However, the form of MIMO/CoMP being used may have an impact on the type and amount of feedback information that the receiver needs to provide. Furthermore, there may be an extremely large number of MIMO and CoMP combinations. Therefore, it may be impractical for a communications system to support all combinations of MIMO and CoMP.

Therefore, there is a need for a feedback information framework that facilitates large variations of potential MIMO/CoMP techniques while keeping feedback overhead and complexity low.

SUMMARY OF THE INVENTION

These technical advantages are generally achieved by embodiments of a system and method for information feedback in a communications system with coordinated multiple point transmission (CoMP).

In accordance with a preferred embodiment of the present invention, a method for operating in a communications system is provided. The communications system has a first communications controller and a second communications controller participating in a coordinated multiple point (CoMP) cooperation set. The method includes selecting a CoMP processing technique, and reporting channel information to the first communications controller. The channel information is based on the CoMP processing technique.

In accordance with another preferred embodiment of the present invention, a method for operating in a communications system is provided. The communications system has a first communications controller and a second communications controller participating in a coordinated multiple point (CoMP) cooperation set. The method includes receiving a report of a CoMP processing technique from a communications device, receiving channel information based on the CoMP processing technique from the communications device, adjusting a transmitter based on the channel information, and transmitting information to the communications device using the adjusted transmitter.

In accordance with another preferred embodiment of the present invention, a communications device is provided. The communications device includes a receiver, a transmitter, and a controller coupled to the transmitter and to the receiver. The receiver receives incoming information from a data input port, and the transmitter transmits outgoing information to a data output port. The controller selects a coordinated multiple point (CoMP) processing technique, computes an adjustment for channel information, and provides the adjustments.

An advantage of an embodiment is that the feedback overhead and complexity is kept low while supporting a large number of different MIMO/CoMP processing techniques.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Third Generation Partnership Project (3GPP) Long Term Evolution (LTE) compliant communications system. The invention may also be applied, however, to other communications systems, include those that are 3GPP LTE-Advanced, WiMAX, or so forth, compliant.

A communications system may need to support a range of CoMP processing techniques since different CoMP processing techniques perform better under different system conditions. For example, non-coherent joint transmission (NC-JT), where signals from multiple cells are transmitted to the same UE and the signals need not to be combined coherently over the air, may be best suited for conditions wherein there is a relatively small power imbalance or difference between the received power levels of the signals from multiple cells at the UE and each channel has rank that is lower than the number of receive antennas at the UE. An advantage of NC-JT may be that it is capable of improving the UE's data rate through the use of higher order single user (SU) MIMO.

While coordinated beamforming (CB), where only the serving cells transmit to the UE with the precoding coordinated between the cells, may be best suited for conditions wherein there is a relatively small power imbalance between the received power levels of the signals from multiple cells at the UE and a serving cell's channels have sufficient rank. In addition, in the case that only the serving cells transmit to the UE, the requirements to the backhaul connecting the multiple cells may be relaxed in terms of its capacity and latency. A serving cell may be an eNB that is coordinating the operation of cells (eNBs and relay nodes (RNs)) within a CoMP cooperation set, while the remaining eNBs and RNs in the CoMP cooperation set may be referred to as assistant cells.

In another CoMP processing technique commonly referred to as mute, where some cells do not transmit in certain time-frequency region(s), an environment where there is a relatively large power imbalance with a dominant source of interference may be best suited. An advantage of mute is that there is low overhead for feedback and/or backhaul and improved serving cell data rate. Non-CoMP processing, with no coordination between the cells, may be best suited for environments with a large power imbalance and with no dominant source of interference. An advantage of non-CoMP processing is its low overhead for feedback and backhaul and good separation of cells that allow for efficient frequency reuse.

Coherent joint transmission (C-JT), where signals from multiple cells are transmitted to the same UE and phases of precoders of the cells are adjusted to ensure the signals combine coherently over the air, may be best suited for environments with small power imbalance and timing/phase errors. An advantage of C-JT may include improved received SINR but may be troubled by larger overhead for feedback and/or backhaul. Other coordination schemes among multiple NBs, such as various time and/or frequency domain reuse and/or power control schemes, commonly referred to as fractional/soft reuse, or interference coordination schemes, may also be viewed as a category of CoMP schemes and may be suited for different scenarios.

Figure 1:
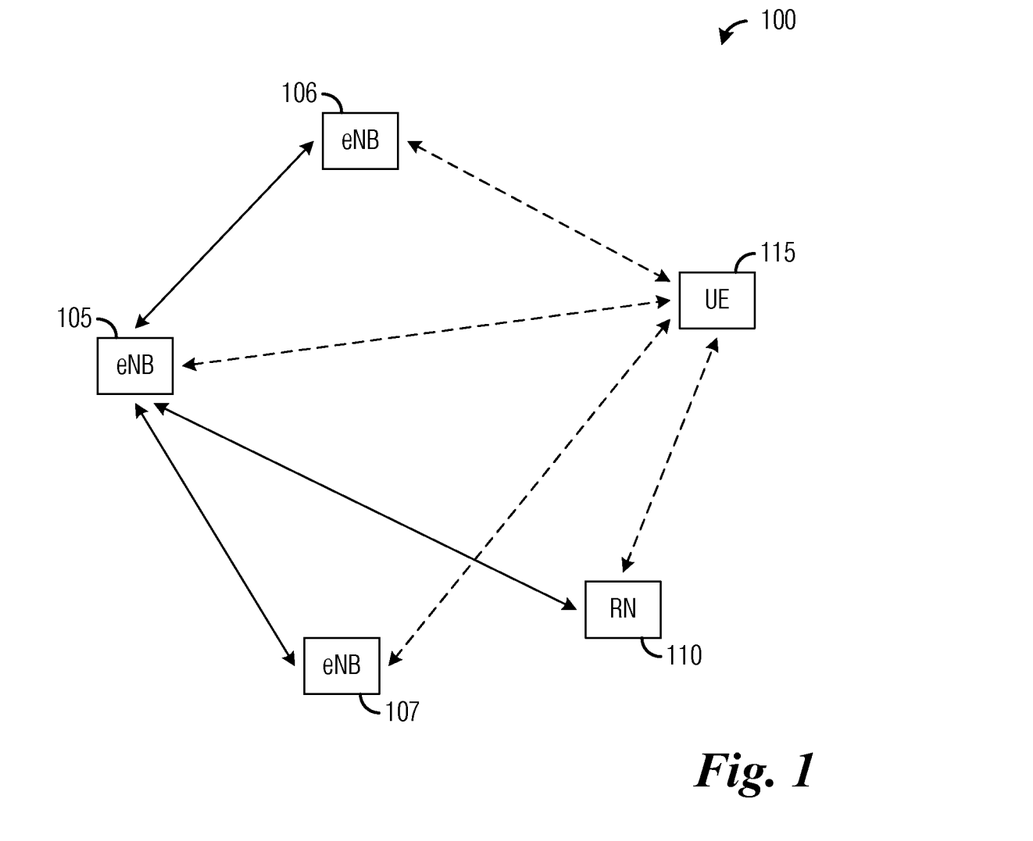
FIG. 1 is a diagram of a communications system.

FIG. 1 illustrates a communications system 100. Communications system 100 includes a number of eNBs, such as eNB 105, eNB 106, and eNB 107, as well as a RN 110. The eNBs and RN 110 may be operating in a coordinated manner (i.e., CoMP) in order to improve the overall performance of a UE 115 or a group of UEs. The eNBs and RN 110 may have one or more transmit antennas, while UE 115 or each UE in the group of UEs may have one or more receive antennas.

Although RN 110 may not be a fully capable eNB, for the purposes of CoMP, RN 110 may be considered to be functionally equivalent to an eNB. Therefore, the discussion herein will refer to only eNBs, but it should be understood that a RN may be used in place of an eNB in CoMP operation without loss of CoMP functionality.

Transmissions from the eNBs may be coordinated by a serving cell (for example, eNB 105) so that the transmissions to UE 115 occur at substantially the same time. The other eNBs that are in CoMP with the serving cell may be referred to as assistant cells. UE 115 may be able to combine the transmissions from the eNBs to improve its overall performance.

UE 115 may collect channel information of channels between each transmit antenna (of each of the eNBs) and each of it's receive antenna(s) and provide the channel information to the serving cell, all of the cells in the CoMP cooperation set, or a subset of the cells in the CoMP cooperation set. The serving cell or a center controller may process the channel information prior to providing the channel information to the assistant cells.

The channel information that UE 115 provides to the serving cell depends on the CoMP processing being or to be used in the communications system. For example, for preferred CoMP processing (PCP) feedback, UE 115 may report multiple PCPs, with one being reported for each assistant cell, with the PCP being based on the CoMP processing being or to be used. The reported PCPs may be different for each of the assistant cells. In an alternative embodiment, UE 115 may report a common PCP for the CoMP cooperation set. In yet another alternative embodiment, the serving cell may decide the PCP for the CoMP cooperation set and/or for each of the assistant cells of the CoMP cooperation set.

If, for example, coherent joint transmission (C-JT) is being or to be used, then coherent joint transmission is preferred between the serving cell and the assistant cell(s); if non-coherent joint transmission (NC-JT) is being or to be used, then each specific layer is assumed to only transmit from antennas of one cell and joint transmission occurs only across layers; if coordinated beamforming (CB) is being or to be used, then the assistant cell(s) should transmit for other UEs with a null space reported through PMI/CSI; if mute is being or to be used, then the muting of the assistant cell(s) is preferred; if non-CoMP processing is being or to be used, then low signal strength from this assistant cell is being measured and no coordination is needed; and so forth.

The serving cell or a central controller (i.e., an entity operating as a coordinator of a CoMP cooperating set or of an entire communications system) may limit the UE to reporting a PCP from a subset of possible PCPs. Limiting the UE to selecting a PCP from the subset of PCPs may help to reduce overhead and/or facilitate implementation of certain CoMP processing techniques. Different subsets of possible PCPs for different assistant cells may be determined by the serving cell or the central controller.

The UE may select a different PCP for each of the different assistant cells. For example, in a CoMP cooperation set with just a serving cell and one assistant cell, the UE may select a preferred PCP for the two cells. While, in a CoMP cooperation set with a serving cell and two assistant cells, the UE may select two PCPs. In general, the UE may select a PCP for each assistant cell. The PCPs selected may be all the same or they may be different.

Additionally, the serving cell or the central controller may override the PCP reported by the UE. When the UE reports a preferred PCP of, for example, muting of an assistant cell, the eNB may decide not to mute this assistant cell but perform other CoMP processing from this assistant cell, for example NC-JT or non-CoMP processing. The serving cells' decisions on whether accepting or overriding of the reported PCP may be different for each assistant cell. The overriding of the reported PCP may be based on an amalgamation of all fed back channel information as well as status of the communications system.

The UE may also feed back rank information (RI). RI may be the number of layers for the selected precoding. In another case, RI may be the number of main eigen-components of the channel state information. In yet another case, RI may be the dimensions of the null space of the channel. The UE may report multiple RIs, with one being reported for each assistant cell and the serving cell. The RI of the serving cell may be the same as the RI of the serving cell in a non-CoMP processing case. Additionally, the RI of the assistant cells if needed may differ based on the CoMP processing being or to be used. For example, with C-JT no RI is needed for the assistant cells, while for NC-JT the rank of PMI for additional layers or main eigen-components of the channel for the same UE. For CB the number of layers of PMI/CSI for null-space is reported by the UE and for mute and non-CoMP no RI is reported by the UE. The PCP and RI reported by the same UE may be jointly coded.

The UE may also feedback precoding matrix indicator (PMI) or channel state information (CSI), with the UE reporting multiple PMI/CSI (one for each assistant cell and the serving cell). The PMI/CSI feedback for each assistant cell may depend upon the reported PCP and RI of the assistant cell, while the PMI/CSI feedback for the serving cell may be the same as in a non-CoMP case. Additionally, the PMI/CSI of the assistant cells if needed may differ based on the CoMP processing being or to be used. For example, with C-JT the UE reports the PMI/CSI to facilitate C-JT from the assistant cell, while for NC-JT, the UE reports PMI for additional layers or main eigen-components of CSI for the same UE. For CB, the UE reports PMI or main eigen-components of the null-space. For mute and non-CoMP, the UE does not report PMI/CSI. The reported PMI/CSI of the assistant cell may take into consideration the PMI/CSI of the serving cell as well as the reported PCP(s).

The UE may also feed back channel quality indicator (CQI) which comprises information for the received signal quality, or the received interference information, or a combination of both, with the UE reporting multiple CQI (one for each assistant cell and the serving cell). The CQI reported for each cell comprises channel quality information for multiple layers/codewords of MIMO transmission. The CQI reported for each cell may further comprise channel quality information for MU-MIMO pairing. The CQI of each assistant cell depends upon the reported PCP of the assistant cell, while the CQI of the serving cell may be the same as in a non-CoMP processing case. For example, the CQI report for the assistant cell comprises additional information if needed that, when combined with the CQI for the serving cell, allows the serving cell to accurately select the modulation level and coding rate for transmission assuming that the serving cell follows the reported PCP for this assistant cell.

Additionally, the CQI of the assistant cells may differ based on the CoMP processing being or to be used. For example, with C-JT the UE reports an adjustment of the serving cell CQI. For NC-JT, the UE reports the CQI of additional layers and an adjustment of the serving cell CQI if additional layers are scheduled. For CB and mute, the UE reports an adjustment of the serving cell CQI and for non-CoMP, the UE does not report additional CQI for assistant cell(s). The serving cell uses this additional information for CQI adjustment when it follows the reported PCP of the assistant cell. In the case that serving cell overrides the reported PCP and decides to do otherwise, the CQI adjustment may be ignored or be utilized indirectly.

In the case that the serving cell follows multiple reported PCPs for the assistant cells, then multiple CQI adjustments may be made to facilitate accurate modulation level and coding rate selection. In this case, an order that the multiple CQI adjustments to be made may be defined. This order if defined shall be known to both the reporting UE and the serving cell. The order of the CQI adjustment may be defined as an order of the CoMP processing techniques. For example, the adjustment for C-JT may be made first, followed by adjustments for NC-JT, CB, mute, and etc. In an alternative embodiment, the order of the CQI adjustment may be defined as an order of the IDs of the assistant cells. In another alternative embodiment, the order of the CQI adjustment may be defined as a combined order of the CoMP processing techniques and the IDs of the assistant cells.

Figure 2:
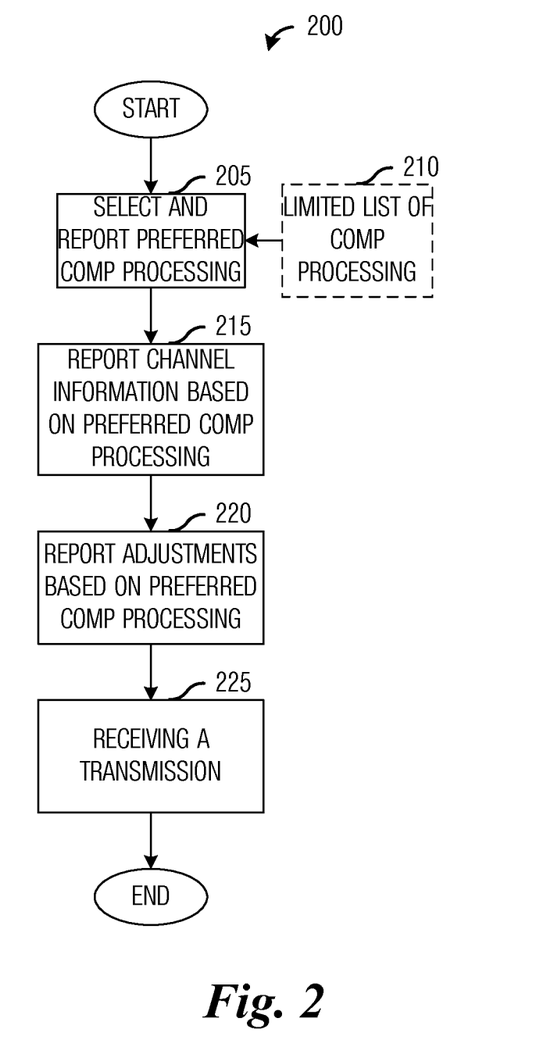
FIG. 2 is a flow diagram of UE operations in reporting channel information to a serving cell or assistant cells.

FIG. 2 illustrates a flow diagram of UE operations 200 in receiving a transmission from a serving cell. Operations involved in receiving a transmission may include reporting channel information to a serving cell, all of the cells in the CoMP cooperation set, or a subset of the cells in the CoMP cooperation set. UE operations 200 may be indicative of operations taking place in a UE, such as UE 115, as it receives the transmission from the serving cell, provides channel information to the serving cell, all of the cells in the CoMP cooperation set, or the subset of the cells in the CoMP cooperation set. UE operations 200 may occur periodically or it may be event driven, i.e., UE operations 200 may occur when a specified event(s) occurs. As discussed previously, the channel information provided by the UE may include rank information, precoding matrix indicators, channel state information, channel quality indicators, and so forth. In addition, the UE may provide a preferred CoMP processing technique as well as adjustments (if needed) to the channel information. The channel information provided by the UE may vary depending on the preferred CoMP processing technique selected by the UE and/or the UE's serving cell.

UE operations 200 may begin with the UE selecting a preferred CoMP processing technique and reporting the selected preferred CoMP processing technique to the serving cell (block 205). The UE may select the preferred CoMP processing technique out of all possible CoMP processing techniques, out of a set of CoMP processing techniques supported in a communications system of which it is a part, a set of preferred CoMP processing techniques, a set of allowed CoMP processing techniques, and so forth. In a situation where a single CoMP processing technique is allowed for an assistant cell or an entirety of the CoMP cooperation set, it may possible to bypass the selection of the preferred CoMP processing technique by the UE for the assistant cell.

The sets of preferred CoMP processing techniques and allowed CoMP processing techniques (e.g., the set of CoMP processing techniques supported in a communications system of which it is a part, the set of preferred CoMP processing techniques, the set of allowed CoMP processing techniques, and so forth) may be specified by the serving cell and/or communications system operator. The CoMP processing techniques included in the sets may be based on communications system capabilities (load, available resources, and so forth), capabilities of members of the CoMP cooperation set (load, available resources, and so forth), preferred CoMP processing techniques, and so on. The sets of preferred CoMP processing techniques and allowed CoMP processing techniques may be optional and may or may not be available for consideration by the UE as it selects its preferred CoMP processing technique (block 210).

The UE may select a different preferred CoMP processing technique for each of the different assistant cells in the CoMP cooperative set. For example, in a CoMP cooperation set with just a serving cell and one assistant cell, the UE may select a preferred CoMP processing technique for the two cells. While, in a CoMP cooperation set with a serving cell and two assistant cells, the UE may select two preferred CoMP processing technique. In general, the UE may select a preferred CoMP processing technique for each assistant cell. The preferred CoMP processing techniques selected may be all the same or they may be different.

After reporting its preferred CoMP processing technique (block 205), the UE may begin to report channel information to the serving cell (block 215). The channel information reported by the UE may be based on its preferred CoMP processing technique. The UE may report channel information for each member of the CoMP cooperation set. For example, if the UE is reporting RI, then the RI of the serving cell may be same as the RI of the serving cell in a non-CoMP case. Additionally, the RI of the assistant cells may differ based on the CoMP processing being used. For example, with C-JT no RI is needed for the assistant cells, while for NC-JT the rank of PMI for additional layers or main eigen-components for the same UE. For CB the number of layers of PMI/CSI for null-space is reported by the UE and for mute and non-CoMP no RI is reported by the UE. The PCP and RI reported by the same UE may be jointly coded.

Similarly, if the UE is reporting PMI or CSI, then the PMI/CSI feedback for each assistant cell may depend upon the reported PCP of the assistant cell, while the PMI/CSI feedback for the serving cell may be the same as in a non-CoMP case. Additionally, the PMI/CSI of the assistant cells may differ based on the CoMP processing being used. For example, with C-JT the UE reports the PMI/CSI to facilitate C-JT from the assistant cell, while for NC-JT, the UE reports PMI for additional layers or main eigen-components of CSI for the same UE. For CB, the UE reports PMI or main eigen-components of the null-space. For mute and non-CoMP, the UE does not report PMI/CSI. The reported PMI/CSI of the assistant cell may take into consideration the PMI/CSI of the serving cell as well as the reported PCP(s).

While if the UE is reporting CQI, then the CQI of each assistant cell depends upon the reported PCP of the assistant cell, while the CQI of the serving cell may be the same as in a non-CoMP case. Additionally, the CQI of the assistant cells may differ based on the CoMP processing being or to be used. For example, with C-JT the UE reports an adjustment of the serving cell CQI. For NC-JT, the UE reports the CQI of additional layers and an adjustment of the serving cell CQI if additional layers are scheduled. For CB and mute, the UE reports an adjustment of the serving cell CQI and for non-CoMP, the UE does not report CQI. The order of the CQI adjustment may be defined and known to both the serving cell and the reporting UE.

The UE may also report adjustments to the channel information (block 220). The adjustments to the channel information may only be needed for certain forms of channel information, such as CQI. Additionally, the adjustments may be based on the UE's preferred CoMP processing technique. Furthermore, the adjustments may or may not be used by the serving cell. The UE may then receive a transmission from the serving cell and/or cells in the CoMP cooperating set, wherein the transmission may be based on the reported preferred CoMP processing technique (block 225). UE operations 200 may then terminate.

Figure 3:
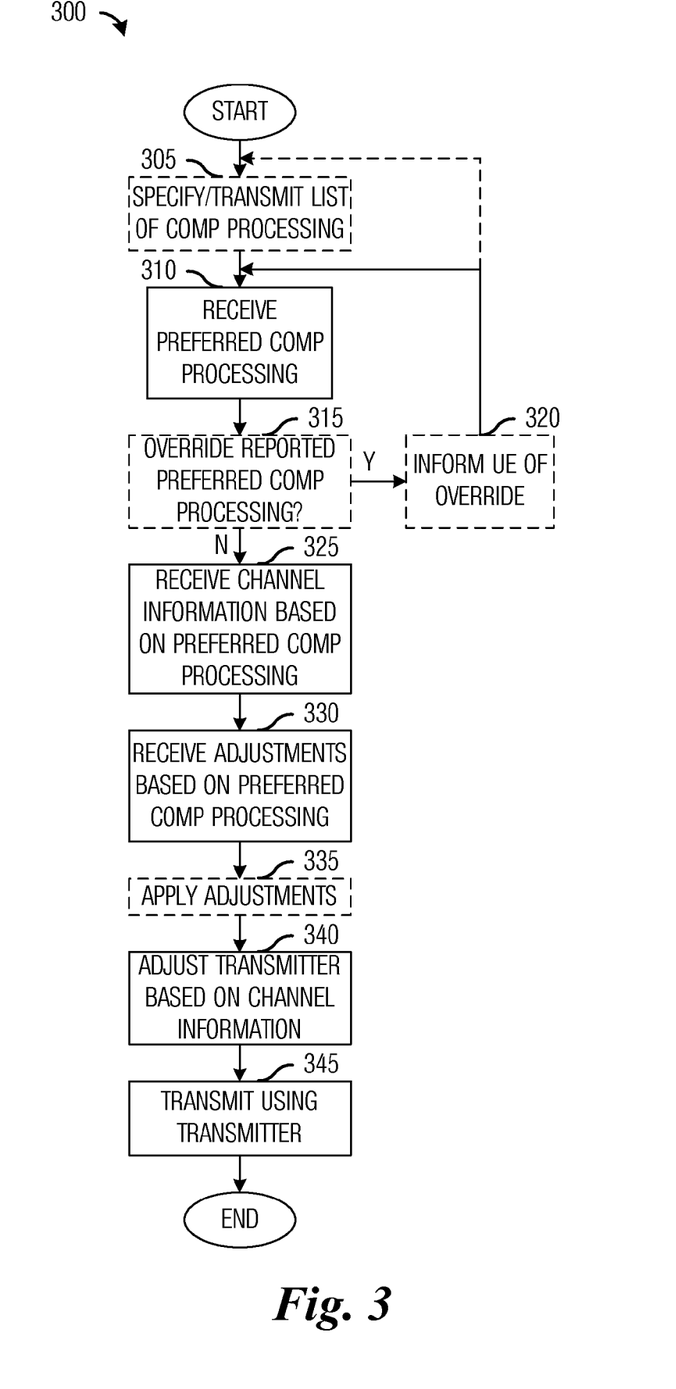
FIG. 3 is a flow diagram of eNB operations in processing channel information from a UE, where both the eNB and the UE are part of a communications system.

FIG. 3 illustrates a flow diagram of eNB operations 300 in processing channel information from a UE and transmitting information to the UE, where both the eNB and the UE are part of a communications system. eNB operations 300 may be indicative of operations taking place in an eNB, such as eNB 105, which may be operating as a serving cell of a CoMP cooperative set, as it processes channel information provided by a UE, such as UE 115, and transmits information to the UE. eNB operations 300 may occur periodically or it may be event driven, i.e., eNB operations 300 may occur when a specified event(s) occur. Examples of specified events include an error rate reaching a threshold, an expiration of a specified time duration, and so forth. As discussed previously, the channel information received by the eNB may include rank information, precoding matrix indicators, channel state information, channel quality indicators, and so forth. In addition, the eNB may receive a preferred CoMP processing technique as well as adjustments (if needed) to the channel information. The channel information received by the eNB may vary depending on the preferred CoMP processing technique selected by the UE and/or the UE's serving cell.

eNB operations 300 may optionally begin with the eNB specifying and providing a list of preferred CoMP processing techniques for the UE (block 305). If the eNB specifies the list of preferred CoMP processing techniques, then the eNB is expecting the UE to select a preferred CoMP processing technique only from one of the CoMP processing techniques in the list of preferred CoMP processing techniques. The eNB may specify the list of preferred CoMP processing techniques to limit the number of available CoMP processing techniques, emphasize a CoMP processing technique(s) that the eNB prefers, and so forth. Furthermore, since the eNB may have more information regarding the state and status of the communications system than the UE and may be able to make an informed decision regarding which CoMP processing techniques may yield good performance.

The list of preferred CoMP processing techniques for a UE may differ for different assistant cells of the CoMP cooperation set. The eNB (or the central controller) may decide that only a certain subset of CoMP techniques or even a single CoMP technique is feasible for certain assistant cell(s) based on its own knowledge or consideration of the situation of the assistant cell(s). Examples of the knowledge and consideration provided by the eNB (or the central controller) may include geometric locations of the cells, backhaul properties between the eNBs, load of the neighboring sites of the communications system, complexity of the different CoMP techniques, and so on.

In an embodiment, the serving cell may decide to include C-JT and/or NC-JT as viable preferred CoMP processing technique candidates only for assistant cells that are collocated with the serving cell or are connected with the serving cell through high capacity and low latency backhaul. In another embodiment, the serving cell may decide to only include CoMP processing techniques that need small feedback and backhaul overhead, for example muting or non-CoMP, as viable preferred CoMP processing technique candidates for assistant cells that are either geometrically separated and/or with large power imbalances. In yet another embodiment, different CoMP processing techniques may be included as viable candidates for assistant cells depending on the characteristics of their antenna arrays, for example, the number of transmit antennas, and the spacing and the polarization of the antennas. In yet another embodiment, different CoMP processing techniques may be included as viable candidates for assistant cells depending on the type of the assistant cells. For example, the types of the cells may include femto cell, pico cell, RN, macro cell (which can be further characterized as low/high power nodes), CSG (closed subscribe group)/OSG (open subscribe group) nodes, indoor/outdoor nodes, and etc.

The eNB may then receive a preferred CoMP processing technique from the UE (block 310). The preferred CoMP processing technique selected by the UE may be selected from the list of preferred CoMP processing techniques (if the eNB provided such a list). If the eNB did not provide the list of preferred CoMP processing techniques to the UE, then the UE may select its own preferred CoMP processing technique based on its own preferences, capabilities, its understanding of the condition of the communications system, a list provided by another source, and so forth.

At its own discretion, the eNB may decide to accept the preferred CoMP processing technique sent by the UE (block 315). The eNB may base its decision to accept or reject the preferred CoMP processing technique on information such as conditions of the communications system, conditions of other members of the CoMP cooperation set, and so forth. If the eNB rejects the preferred CoMP processing technique selected by the UE, then the eNB may inform the UE of its decision (block 320). The eNB may then return to block 310 to receive the UE's new selection of preferred CoMP processing technique. Alternatively, if the eNB did not previously specify/transmit the list of preferred CoMP processing techniques to the UE, then the eNB may now do so (block 305) and then wait to receive the UE's new selection of preferred CoMP processing technique (block 310). In another alternative, the eNB may accept or reject the preferred CoMP processing technique sent by the UE in a more dynamic way without informing the UE its decision.

The eNB may then receive channel information from the UE (block 325). The UE may provide to the serving eNB channel information for the serving eNB and for each of the assistant cells in the CoMP cooperation set. The amount and type of channel information provided by the UE may be dependent on the preferred CoMP processing technique selected by the UE. Additionally, the eNB may receive adjustments to the channel information reported by the UE (block 330). The UE may or may not send adjustments to the eNB depending on the channel information that it sent previously. The eNB may then optionally select to apply the adjustments to the channel information provided by the UE (block 335).

The eNB may then adjust its transmitter using the channel information (block 340). The eNB may also provide the channel information to assistant cells so that they may make necessary adjustments to their transmitters. The eNB may then coordinate transmissions for the UE and then transmit data to the UE (block 345). eNB operations 300 may then terminate.

Figure 4:
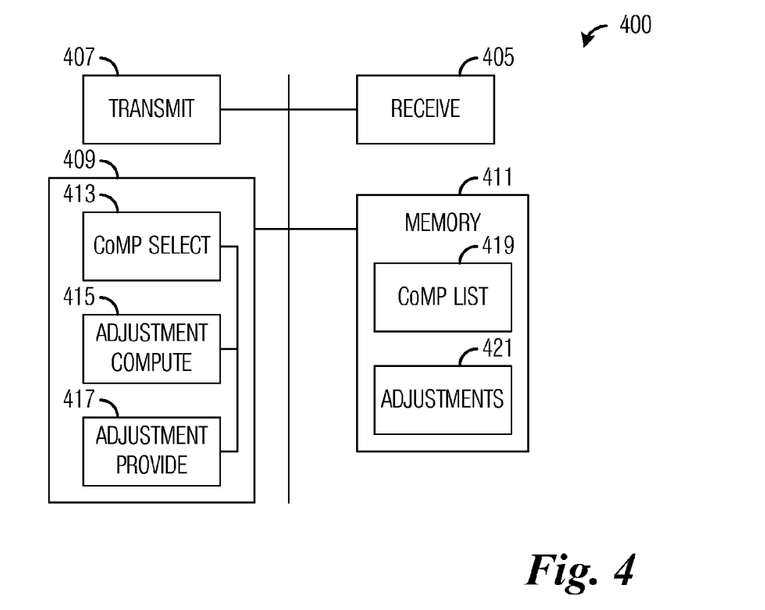
FIG. 4 is a diagram of a UE.

FIG. 4 illustrates a UE 400. UE 400 may be used in a communications system, such as a 3GPP LTE compliant communications system with support for CoMP processing. UE 400 may include a receive unit 405 that may be used to receive incoming information. UE 400 may also include a transmit unit 407 that may be used to transmit outgoing information. In general, information may arrive at UE 400 through receive unit 405 and may leave UE 400 through transmit unit 407.

UE 400 may also include a control unit 409. Control unit 409 may be implemented using a general purpose or special purpose processor or controller, combinatorial logic, state machines, or a combination thereof. Control unit 409 may be used to control the operation of UE 400. UE 400 also includes a memory 411 that may be used to store information, such as UE specific information, CoMP processing information, scratch memory, buffer space, and so forth. Memory 411 may be a combination of read-only memory, random access memory, programmable read-only memory, and so on.

Control unit 409 may include a CoMP select unit 413, an adjustment compute unit 415, and an adjustment provide unit 417. CoMP select unit 413 may be used to select a preferred CoMP processing for UE 400. CoMP select unit 413 may select the preferred CoMP processing for UE 400 based on a number of considerations, such as communications system capabilities (load, traffic, available resources, and so forth), capabilities of members of the CoMP cooperation set (load, available resources, and so forth), channel conditions between the UE 400 and the cells of the CoMP cooperation set, preferred CoMP processing techniques, and so on. CoMP select unit 413 may select the preferred CoMP processing from a set of CoMP processing techniques supported in a communications system of which it is a part, a set of preferred CoMP processing techniques, a set of allowed CoMP processing techniques, and so forth, which may be stored in CoMP list store 419 in memory 411. The list of CoMP processing techniques from which CoMP select unit 413 selects from may be provided by a serving cell, an operator of the communications system, or so on. CoMP select unit 413 may be implemented from combinatorial logic, boolean functions, programmable gate arrays, or so on.

Adjustment compute unit 415 may be used to compute adjustments to channel information provided by UE 400 to a serving cell of UE 400. According to an embodiment, adjustments to the channel information may be required for certain forms of channel information, such as CQI, for example. Furthermore, the adjustments may be based on the preferred CoMP processing technique of UE 400. For example, some forms of CoMP processing techniques do not require adjustments, while some other do not even need UE 400 to even provide channel information. Adjustment compute unit 415 may be implemented as a table or memory (for example, stored in adjustments store 421 in memory 411) that includes exemplary adjustments for a variety of preferred CoMP processing techniques and forms of channel information.

Adjustment provide unit 417 may be used to provide adjustments to channel information to be reported by UE 400. According to an embodiment, adjustment provide unit 417 may access adjustments store 421 and retrieve adjustments for the channel information to be reported by UE 400 to its serving cell. Adjustment provide unit 417 may also generate a message containing adjustments to be fed back to the serving cell.

Figure 5:
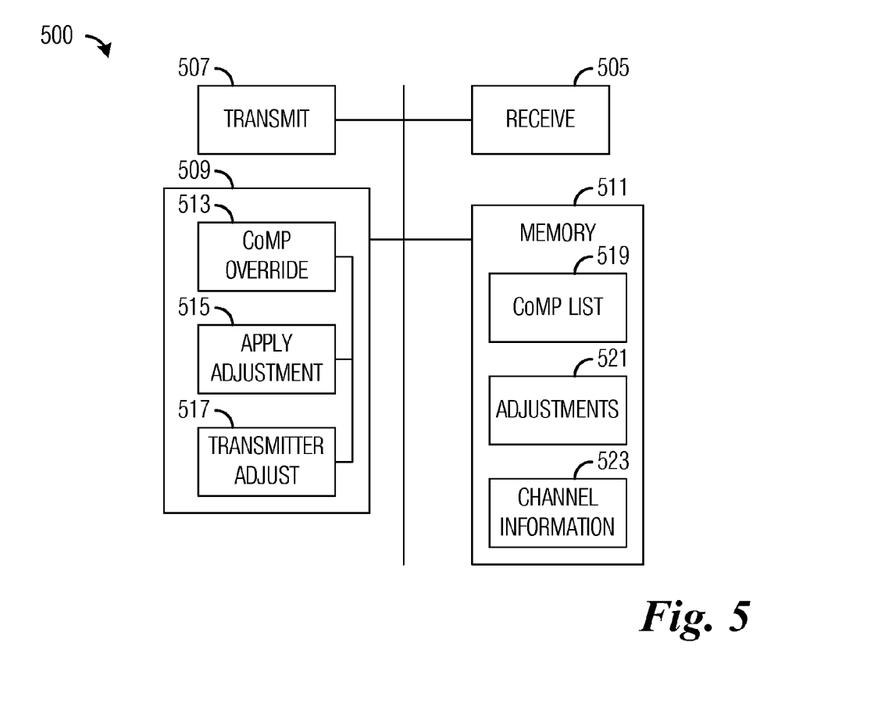
FIG. 5 is a diagram of an eNB.

FIG. 5 illustrates an eNB 500. eNB 500 may be used in a communications system, such as a 3GPP LTE compliant communications system with support for CoMP processing. eNB 500 may include a receive unit 505 that may be used to receive incoming information. eNB 500 may also include a transmit unit 507 that may be used to transmit outgoing information. In general, information may arrive at eNB 500 through receive unit 505 and may leave eNB 500 through transmit unit 507.

eNB 500 may also include a control unit 509. Control unit 509 may be implemented using a general purpose or special purpose processor or controller, combinatorial logic, state machines, or a combination thereof. Control unit 509 may be used to control the operation of eNB 500. eNB 500 also includes a memory 511 that may be used to store information, such as eNB specific information, CoMP processing information, transmission grants, scratch memory, buffer space, and so forth. Memory 511 may be a combination of read-only memory, random access memory, programmable read-only memory, and so on.

Control unit 509 may include a CoMP override unit 513, an apply adjustment unit 515, and a transmitter adjust unit 517. CoMP override unit 513 may be used to determine if a preferred CoMP processing reported by a UE served by eNB 500 should be accepted or rejected. eNB 500 may base its decision to accept or reject the preferred CoMP processing technique reported by the UE on information such as conditions of the communications system, conditions of other members of the CoMP cooperation set, and so forth. In addition to accepting/rejecting the preferred CoMP processing technique as reported by the UE, CoMP override unit 513 may also select a CoMP processing technique for the UE should it determine to reject the preferred CoMP processing technique reported by the UE. CoMP override unit 513 may inform the assistant cells of the CoMP cooperation set its decision on the CoMP processing to be used for each of the assistant cells.

CoMP override unit 513 may utilize a list of CoMP processing stored in a CoMP processing store 519 of memory 511. As an example, the UE may report a preferred CoMP processing technique. However, eNB 500 may determine that the preferred CoMP processing technique is not suitable for the UE based on current communications system load conditions, conditions of other members of the CoMP cooperation set, and so on, and select a CoMP processing technique for the UE on its own. CoMP override unit 513 may be implemented from combinatorial logic, boolean functions, programmable logic arrays, or so on.

Apply adjustment unit 515 may be used to apply an adjustment to channel information provided by the UE served by eNB 500. According to an embodiment, apply adjustment unit 515 may determine if it will accept or reject adjustment information provided by the UE and if accepted, apply adjustment unit 515 may apply the adjustment to the channel information. If apply adjustment unit 515 decides to reject the adjustments provided by the UE, apply adjustment unit 515 may further determine to apply its own adjustments to the channel information provided by the UE. Adjustments provided by the UE and/or its own adjustments may be stored in adjustments store 521 in memory 511, while channel information may be stored in channel information store 523. Apply adjustment unit 515 may be implemented from combinatorial logic, boolean functions, programmable logic arrays, or so on.

Transmitter adjust unit 527 may be used to make adjustments to transmit unit 507 based on a CoMP processing technique selected by eNB 500 (or selected by the UE and accepted by eNB 500). For example, transmitter adjust unit 527 may precode a transmission to be transmitted by transmit unit 507 prior to transmission of the transmission to the UE. Transmitter adjust unit 527 may precode the transmission by multiplying the transmission with a precoding vector or matrix generated based on channel information provided by the UE in addition to a selected/preferred CoMP processing technique, and adjustments if any. The transmitter adjust unit 527 may also be used to make adjustments to the transmit unit of the assistant cells of the CoMP cooperation set based on the CoMP processing technique selected for each of the assistant cell by eNB 500 (or selected by the UE and accepted by eNB 500). According to an embodiment, transmitter adjust unit 527 may be implemented as a multiplier, combinational logic, programmable logic arrays, or so forth.

Advantageous features of embodiments of the invention may include: A method for operating in a communications network having a controller participating in a coordinated multiple point (CoMP) cooperation set, the method comprising: selecting a preferred CoMP processing technique; and reporting channel information to the controller, wherein the channel information is based on the preferred CoMP processing technique. The method could further include, wherein the CoMP cooperation set further comprises at least one additional controller, and wherein a preferred CoMP processing technique is selected for each of the additional controller. The method could further include, wherein the CoMP cooperation set further comprises at least one additional controller, and wherein a single preferred CoMP processing technique is selected for the controller and all of the additional controllers. The method could further include, wherein the controller selects the preferred CoMP processing technique. The method could further include, wherein the communications network comprises a communications device, and wherein the communication device selects and reports the preferred CoMP processing technique. The method could further include, wherein the CoMP cooperation set further comprises at least one additional controller, and wherein the channel information comprises channel information about the controller and the additional controller. The method could further include, wherein the additional controller comprises a relay node. The method could further include, wherein selecting a preferred CoMP processing technique comprises selecting a preferred CoMP processing technique from a list of preferred CoMP processing techniques. The method could further include, wherein the list of preferred CoMP processing techniques is provided by the controller. The method could further include, wherein the list of preferred CoMP processing techniques comprises non-coherent joint transmission, coordinated beamforming, mute, non-CoMP operation, coherent joint transmission, frequency and/or time reuse scheme, power control scheme, and interference coordination scheme. The method could further include, wherein selecting a preferred CoMP processing technique is based on communications network conditions. The method could further include, wherein the CoMP cooperation set further comprises at least one additional controller, and wherein selecting a preferred CoMP processing technique is further based on conditions of the controller and the additional controller. The method could further include, wherein the reported channel information comprises rank information for precoding, a number of main eigen-components of the channel, a precoding matrix indication, channel state information, channel quality indication, or interference information. The method could further include, wherein the CoMP cooperation set further comprises at least one additional controller, and wherein the reported channel information for the additional controller depends on the preferred CoMP processing technique and channel information of the controller. The method could further include, wherein the CoMP cooperation set further comprises at least one additional controller, wherein channel information is reported for the controller and the additional controller, and wherein the channel information for the controller is reported assuming no cooperation between the controller and the additional controller. The method could further include, wherein the CoMP cooperation set further comprises at least one additional controller, and further comprising, reporting adjustments to the channel information for additional controller. The method could further include, wherein the reported adjustments to the channel information for the additional controller depends on the reported preferred CoMP processing technique and the channel information of the controller. The method could further include, wherein there are multiple reported adjustments, and the method further comprising, applying the reported adjustments based on a specified order. The method could further include, wherein the communications network comprises a communications device, and wherein the specified order is known to both the controller and the communication device.

Advantageous features of embodiments of the invention may include: a method for operating in a communications network, the method comprising: receiving a first preferred coordinated multiple point (CoMP) processing technique from a communications device; receiving channel information based on the first preferred CoMP processing technique from the communications device; adjust a transmitter using the channel information; and transmitting information to the communications device using the adjusted transmitter. The method could further include, wherein a controller and at least one additional controller is participating in a CoMP cooperation set to transmit to the communications device, wherein the controller comprises a transmitter, and wherein adjusting a transmitter comprises: adjusting the transmitter of the controller using the channel information; and providing the channel information to the additional controller so that the additional controller can adjust its own transmitter. The method could further include, wherein adjusting a transmitter further comprises, coordinating transmissions from the controller and the additional controller. The method could further include, further comprising, providing a list of preferred CoMP processing techniques to the communications device. The method could further include, wherein receiving a first preferred CoMP processing technique comprises receiving a first preferred CoMP processing technique selected from the list of preferred CoMP processing techniques. The method could further include, wherein the list of preferred CoMP processing techniques comprises non-coherent joint transmission, coordinated beamforming, mute, non-CoMP operation, coherent joint transmission, frequency and/or time reuse scheme, power control scheme, and interference coordination scheme. The method could further include, further comprising: overriding the first preferred COMP processing technique; and selecting a second preferred CoMP processing technique. The method could further include, wherein there is a plurality of additional controllers, wherein there is a third preferred CoMP processing technique for each additional controller, and wherein a decision to override each third preferred CoMP processing technique in the plurality of third preferred CoMP processing techniques for each of the additional controllers is performed independently for each additional controller. The method could further include, wherein a controller and at least one additional controller is participating in a CoMP cooperation set to transmit to the communications device, and the method further comprising, receiving adjustments of the channel information for the additional controller from the communications device. The method could further include, further comprising, applying the adjustments of the channel information for the additional controller. The method could further include, further comprising, not applying the adjustments of the channel information for the additional controller. The method could further include, wherein not applying the adjustments of the channel information for the additional controller is in response to determining that the first preferred CoMP processing technique is overridden. The method could further include, wherein there are a plurality of additional controllers, and the method further comprising, applying the adjustments of the channel information for the plurality of additional controllers in a specified order.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating in a communications system, the communications system having a first communications controller and a second communications controller participating in a coordinated multiple point (CoMP) cooperation set, the method comprising:
   selecting a CoMP processing technique from a list of CoMP processing techniques for data transmission, wherein at least some CoMP processing techniques in the list of CoMP processing techniques have different feedback requirements; and
   selectively reporting channel information in accordance with a feedback requirement of the selected CoMP processing technique, wherein the channel information is required is reported to the first communications controller, wherein selectively reporting channel information in accordance with the feedback requirement of the selected CoMP processing technique comprises reporting only an amount of channel information required to support the selected CoMP processing technique, and wherein the amount of channel information required to support the selected CoMP processing techniques is less than a maximum amount of channel information capable of being reported to the first communications controller.

2. The method of claim 1, wherein the list of CoMP processing techniques is provided by the first communications controller.

3. The method of claim 1, wherein the list of CoMP processing techniques comprises non-coherent joint transmission, coordinated beamforming, mute, non-CoMP operation, coherent joint transmission, frequency and/or time domain reuse scheme, power control scheme, interference coordination scheme, or a combination thereof.

4. The method of claim 1, wherein the CoMP cooperation set further comprises at least one additional communications controller, and wherein selecting a CoMP processing technique further comprises selecting an additional CoMP processing technique for each additional communications controller of the at least one additional communications controller.

5. The method of claim 4, wherein the additional CoMP processing technique selected for each additional communications controller of the at least one additional communications controller is selected in accordance with a different list of CoMP processing techniques for each additional communications controller of the at least one additional communications controller.

6. The method of claim 4, wherein the additional CoMP processing technique selected for each additional communications controller of the at least one additional communications controller is identical to the CoMP processing technique.

7. The method of claim 1, wherein the CoMP cooperation set further comprises at least one additional communications controller, and wherein the channel information comprises channel information related to the first communications controller, the second communications controller, and each additional communications controller of the at least one additional communications controller.

8. The method of claim 7, wherein the at least one additional communications controller comprises a relay node.

9. The method of claim 1, wherein the channel information comprises rank information for precoding, a number of main eigen-components of the channel, a precoding matrix indication, channel state information, channel quality indication, interference information, or a combination thereof.

10. The method of claim 1, further comprising reporting an adjustment to the channel information.

11. The method of claim 10, wherein the CoMP cooperation set further comprises at least one additional communications controller, and wherein reporting an adjustment to the channel information comprises reporting adjustments to channel information for the second communications controller, and each additional communications controller of the at least one additional communications controller.

12. The method of claim 11, wherein the reported adjustments are applied in a specified order.

13. The method of claim 1, wherein selectively reporting channel information in accordance with the feedback requirement of the selected CoMP processing technique comprises:
reporting types of channel information required to support the selected CoMP processing technique without reporting other types of channel information that are not required to support the selected CoMP processing technique.

14. A method for operating in a communications system, the communications system having a first communications controller and a second communications controller participating in a coordinated multiple point (CoMP) cooperation set, the CoMP cooperation set further comprising at least one additional communication controller, the method comprising:
receiving a report of a CoMP processing technique from a communications device;
receiving channel information in accordance with the CoMP processing technique from the communications device;
adjusting a transmitter in accordance with the channel information;
transmitting information to the communications device using the adjusted transmitter;
overriding the CoMP processing technique;
selecting an alternate CoMP processing technique; and
receiving an additional CoMP processing technique for each additional communications controller of the at least one additional communications controller,
wherein overriding the CoMP processing technique comprises independently overriding each additional CoMP processing technique for each additional communications controller of the at least one additional communications controller.

15. The method of claim 14, further comprising, providing a list of CoMP processing techniques to the communications device, wherein the list of CoMP processing techniques is used to select the CoMP processing technique.

16. The method of claim 15, wherein the CoMP cooperation set further comprises at least one additional communications controller, wherein providing a list of CoMP processing techniques to the communications device comprises providing a different list of CoMP processing techniques to the communications device for the second communications controller, and each additional communications controller of the at least one additional communications controller.

17. The method for operating in a communication system, the communication system having a first communications controller and a second communications controller participating in a coordinated multiple point (CoMP) cooperation set, the method comprising:
receiving a report of a CoMP processing techniques from a communication device;
receiving channel information in accordance with the CoMP processing technique from the communications device;
adjusting a transmitter in accordance with the channel information;
transmitting information to the communications device using the adjusted transmitter;
receiving an adjustment for the channel information from the communications device;
determining if the adjustment should be applied;
applying the adjustment to the channel information if the adjustment should be applied; and
not applying the adjustment to the channel information if the adjustment should not be applied.

18. The method of claim 17, wherein determining if the adjustment should be applied comprises determining if the CoMP processing technique is overridden.

19. The method of claim 17, wherein the CoMP cooperation set further comprises at least one additional communications controller, wherein there are adjustments for channel information for the second communications controller, and each additional communications controller of the at least one additional communications controller, and wherein applying the adjustment to the channel information comprises applying the adjustments to the channel information in a specified order.

20. The communications device comprising:
   a receiver configured to receive incoming information from a data input port;
   a transmitter configured to transmit outgoing information to a data output port; and
   a controller coupled to the transmitter and to the receiver, the controller configured to select a coordinated multiple point (CoMP) processing technique, to compute and adjustment for channel information, and to provide the adjustments, wherein the controller comprises:
      a CoMP select unit configured to select the CoMP processing technique in accordance with operating conditions of the communications device and a list of CoMP processing techniques;
      an adjustment compute unit coupled to the CoMP select unit, the adjustment compute unit configured to compute adjustment to the channel information in accordance with the selected CoMP processing technique; and
      an adjustment provide unit coupled to the adjustment compute unit, the adjustment provide unit configured to provide adjustments computed by the adjustment compute unit to a serving cell of the communications device.

21. The communications device of claim 20, wherein the list of CoMP processing techniques is provided by the serving cell of the communications device.

22. An apparatus comprising:
   a processor; and
   a non-transitory computer readable storage medium storing programming for execution by the processor, the programming including instructions to:
      select one out of a plurality of coordinated multiple point (CoMP) processing techniques for data transmission, wherein at least some of the plurality of CoMP processing techniques have different feedback requirements;
      identify required channel information in accordance with the feedback requirements of the selected CoMP processing techniques; and
      selectively report the required channel information to a communication controller,
   wherein the instruction to selectively report the channel information to the communications controller includes instruction to report an amount of channel information required to support the selected CoMP processing technique, wherein the amount of channel information required to support the selected CoMP processing technique is less than a maximum amount of channel information capable of being reported to the communication controller.

23. The apparatus of claim 22, wherein the instructions to selectively report the channel information to the communications controller includes instructions to:
   report types of channel information required to support the selected CoMP processing technique without reporting other types of channel information not required to support the selected CoMP processing technique.

* * * * *